(12) United States Patent
Nitta

(10) Patent No.: US 10,776,303 B2
(45) Date of Patent: Sep. 15, 2020

(54) INFORMATION PROCESSING SYSTEM AND INFORMATION PROCESSING METHOD

(71) Applicant: KYOCERA DOCUMENT SOLUTIONS INC., Osaka (JP)

(72) Inventor: Kenichiro Nitta, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/589,677

(22) Filed: Oct. 1, 2019

(65) Prior Publication Data

US 2020/0110723 A1    Apr. 9, 2020

(30) Foreign Application Priority Data

Oct. 3, 2018 (JP) ................................ 2018-188037

(51) Int. Cl.
| | |
|---|---|
| *G06F 13/40* | (2006.01) |
| *G06F 9/445* | (2018.01) |
| *G06F 13/36* | (2006.01) |
| *H04N 1/00* | (2006.01) |

(52) U.S. Cl.
CPC ...... *G06F 13/4081* (2013.01); *G06F 9/44505* (2013.01); *G06F 13/36* (2013.01); *H04N 1/00339* (2013.01)

(58) Field of Classification Search
CPC ... G06F 13/4081; G06F 13/36; G06F 9/44505
See application file for complete search history.

(56) References Cited

U.S. PATENT DOCUMENTS

| | | | | |
|---|---|---|---|---|
| 5,778,384 | A  * | 7/1998 | Provino | ................ G06F 16/188 |
| 6,718,372 | B1 * | 4/2004 | Bober | ................... G06F 16/188 |
| | | | | 709/217 |
| 9,569,443 | B1 * | 2/2017 | van Rietschote | ..... G06F 16/116 |
| 2004/0015723 | A1 * | 1/2004 | Pham | ..................... H04L 63/10 |
| | | | | 726/27 |
| 2006/0004684 | A1 * | 1/2006 | Kime | ..................... G06F 16/10 |

FOREIGN PATENT DOCUMENTS

JP          H07182221 A       7/1995

* cited by examiner

*Primary Examiner* — Tim T Vo
*Assistant Examiner* — Phong H Dang
(74) *Attorney, Agent, or Firm* — Li & Cai Intellectual Property (USA) Office

(57) ABSTRACT

The first information processing apparatus is configured to detect the removal device attached to the removal device interface, and send, to the second information processing apparatus, a mount request to mount the removal device, the second information processing apparatus is configured to receive the mount request from the first information processing apparatus, mount, on the second information processing apparatus, the removal device attached to the removal device interface of the first information processing apparatus, and send a mount point identifier to the first information processing apparatus, the mount point identifier being an identifier indicating a mount point of the removal device mounted on the second information processing apparatus, and the first information processing apparatus is further configured to receive the mount point identifier from the second information processing apparatus, and mount the mount point of the second information processing apparatus indicated by the mount point identifier.

4 Claims, 5 Drawing Sheets

INFORMATION PROCESSING SYSTEM AND INFORMATION PROCESSING METHOD

CROSS-REFERENCE TO RELATED PATENT APPLICATION

This application claims the benefit of Japanese Priority Patent Application JP 2018-188037 filed Oct. 3, 2018, the entire contents of which are incorporated herein by reference.

FIELD OF THE DISCLOSURE

The present disclosure relates to an information processing system including a first information processing apparatus to which a removal device is attachable, and a second information processing apparatus connected to the first information processing apparatus via a network. The present disclosure further relates to an information processing method.

BACKGROUND OF THE DISCLOSURE

If an OS (Operation System) of an information processing apparatus fails to support a file system of a removal device (for example, removal medium) attachable to the information processing apparatus, the information processing apparatus is not capable of mounting the removal medium and thereby not capable of operating a file of the removal medium.

SUMMARY OF THE DISCLOSURE

It is desirable to solve a problem in which, if an OS (Operation System) of an information processing apparatus fails to support a file system of a removal device (for example, removal medium) attachable to the information processing apparatus, the information processing apparatus is not capable of mounting the removal medium and thereby not capable of operating a file of the removal medium.

According to an embodiment of the present disclosure, there is provided an information processing system, including:
a first information processing apparatus including
a removal device interface, and
a first controller circuit configured to execute a first OS (Operation System), the first OS failing to support a file system of a removal device, the removal device being attachable to the removal device interface; and
a second information processing apparatus connectable to the first information processing apparatus via a network and including a second controller circuit configured to execute a second OS, the second OS supporting the file system,
the first controller circuit of the first information processing apparatus being configured to
detect the removal device attached to the removal device interface, and
send, to the second information processing apparatus, a mount request to mount the removal device,
the second controller circuit of the second information processing apparatus being configured to
receive the mount request from the first information processing apparatus,
mount, on the second information processing apparatus, the removal device attached to the removal device interface of the first information processing apparatus, and
send a mount point identifier to the first information processing apparatus, the mount point identifier being an identifier indicating a mount point of the removal device mounted on the second information processing apparatus,
the first controller circuit of the first information processing apparatus being further configured to
receive the mount point identifier from the second information processing apparatus, and
mount the mount point of the second information processing apparatus indicated by the mount point identifier.

According to an embodiment of the present disclosure, there is provided an information processing method executable by an information processing system, including
a first information processing apparatus including
a removal device interface, and
a first controller circuit configured to execute a first OS (Operation System), the first OS failing to support a file system of a removal device, the removal device being attachable to the removal device interface, and
a second information processing apparatus connectable to the first information processing apparatus via a network and including a second controller circuit configured to execute a second OS, the second OS supporting the file system,
the information processing method including:
by the first controller circuit of the first information processing apparatus,
detecting the removal device attached to the removal device interface; and
sending, to the second information processing apparatus, a mount request to mount the removal device;
by the second controller circuit of the second information processing apparatus,
receiving the mount request from the first information processing apparatus;
mounting, on the second information processing apparatus, the removal device attached to the removal device interface of the first information processing apparatus; and
sending a mount point identifier to the first information processing apparatus, the mount point identifier being an identifier indicating a mount point of the removal device mounted on the second information processing apparatus; and
by the first controller circuit of the first information processing apparatus, further,
receiving the mount point identifier from the second information processing apparatus; and
mounting the mount point of the second information processing apparatus indicated by the mount point identifier.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Configuration of Information Processing System

Figure 1:
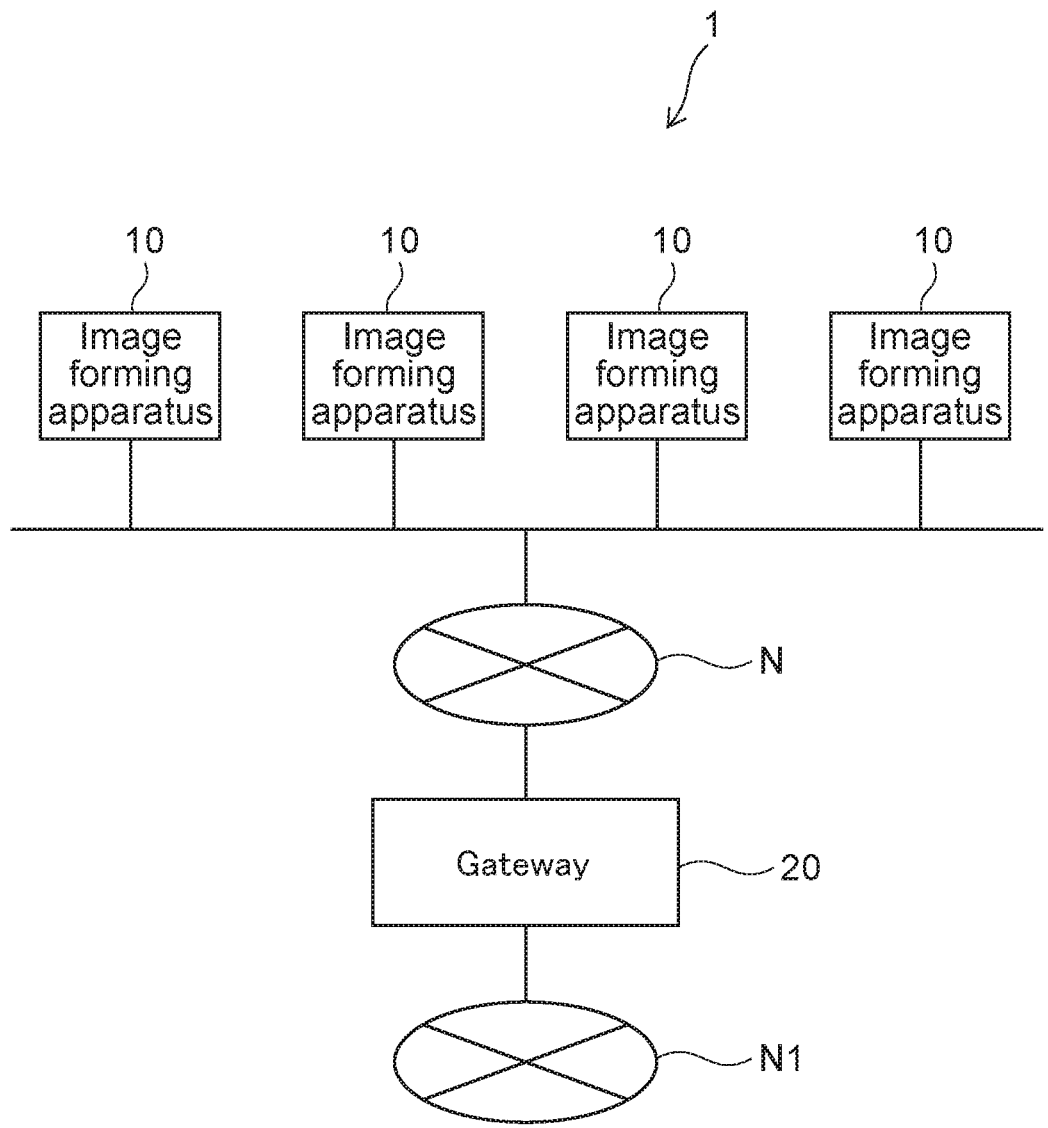
FIG. 1 shows an information processing system according to an embodiment of the present disclosure.

FIG. 1 shows an information processing system according to an embodiment of the present disclosure.

The information processing system 1 includes the plurality of first information processing apparatuses 10 and the one second information processing apparatus 20.

The first information processing apparatus 10 is, for example, an image forming apparatus (for example, MFP, Multifunction Peripheral). Hereinafter, the first information processing apparatus 10 will be referred to as the image forming apparatus 10. Hereinafter, unless otherwise noted, only one image forming apparatus 10 will be described.

The second information processing apparatus 20 is, for example, a gateway. Hereinafter, the second information processing apparatus 20 will be referred to as the gateway 20.

The plurality of image forming apparatuses 10 are connected to the gateway 20 via the network N. The network N fails to include the Internet N1. Specifically, the network N is a LAN (Local Area Network), a WAN (Wide Area Network), or the like. For example, the plurality of image forming apparatuses 10 and the gateway 20 are connect to an intra-office LAN as the network N.

2. Hardware Configuration of Image Forming Apparatus

Figure 2:
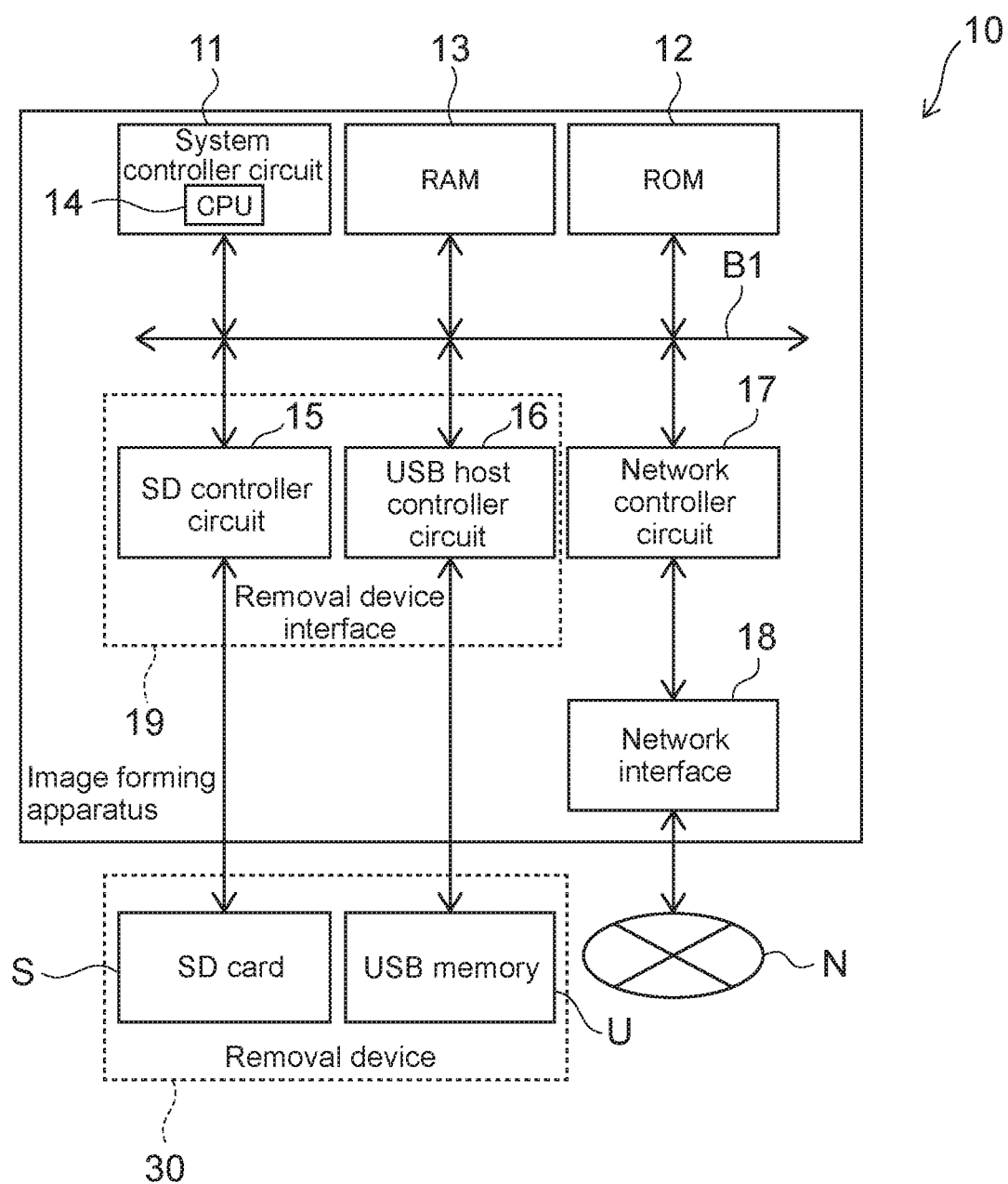
FIG. 2 shows a hardware configuration of an image forming apparatus.

FIG. 2 shows a hardware configuration of an image forming apparatus.

The image forming apparatus 10 includes the system controller circuit 11 (first controller circuit) including the CPU (Central Processing Unit) 14, the ROM (Read Only Memory) 12, the RAM (Random Access Memory) 13, the SD (Secure Digital) controller circuit 15, the USB (Universal Serial Bus) host controller circuit 16, and the network controller circuit 17 to which the network interface 18 is connected. The system controller circuit 11, the ROM 12, the RAM 13, the SD controller circuit 15, the USB host controller circuit 16, and the network controller circuit 17 are connected to each other via the bus B1.

The system controller circuit 11 includes the CPU 14. The CPU 14 of the system controller circuit 11 loads the OS (first OS) and information processing programs stored in the ROM 12 in the RAM 13, and executes the OS (first OS) and the information processing programs.

The ROM 12 is a nonvolatile memory, and stores the OS (first OS), the information processing programs, and the like executable by the system controller circuit 11.

The SD controller circuit 15 is an interface for controlling connection of the SD card S to the image forming apparatus 10.

The USB host controller circuit 16 is an interface for controlling connection of the USB memory U to the image forming apparatus 10 as a host apparatus.

In the present embodiment, the SD controller circuit 15 and the USB host controller circuit 16 will be collectively referred to as the removal device interface 19. The SD card S and the USB memory U will be collectively referred to as the removal device 30.

The network controller circuit 17 controls the network interface 18.

The network interface 18 is an interface for connecting to the network N. The system controller circuit 11 connects to the network N via the network interface 18. The network interface 18 is an interface of a physical layer (PHY). In a data link layer such as GMAC (Ethernet (registered trademark) MAC), the network interface 18 converts electronic signals to logical signals (bit string) (when receiving), and converts logical signals (bit string) to electronic signals (when sending). The network interface 18 may be a detachable LAN interface for connection corresponding to the network N.

The image forming apparatus 10 may further include an image reader (image scanner), an image processor, an image memory, an image forming device (printer), an operation device including a display device (touch panel), a large volume nonvolatile storage device such as an HDD (Hard Disk Drive) or an SSD (Solid State Drive), a facsimile communication device, and the like. However, those devices will not be described and not shown in the drawings since those devices have less relations to the present embodiment.

3. Hardware Configuration of Gateway

Figure 3:
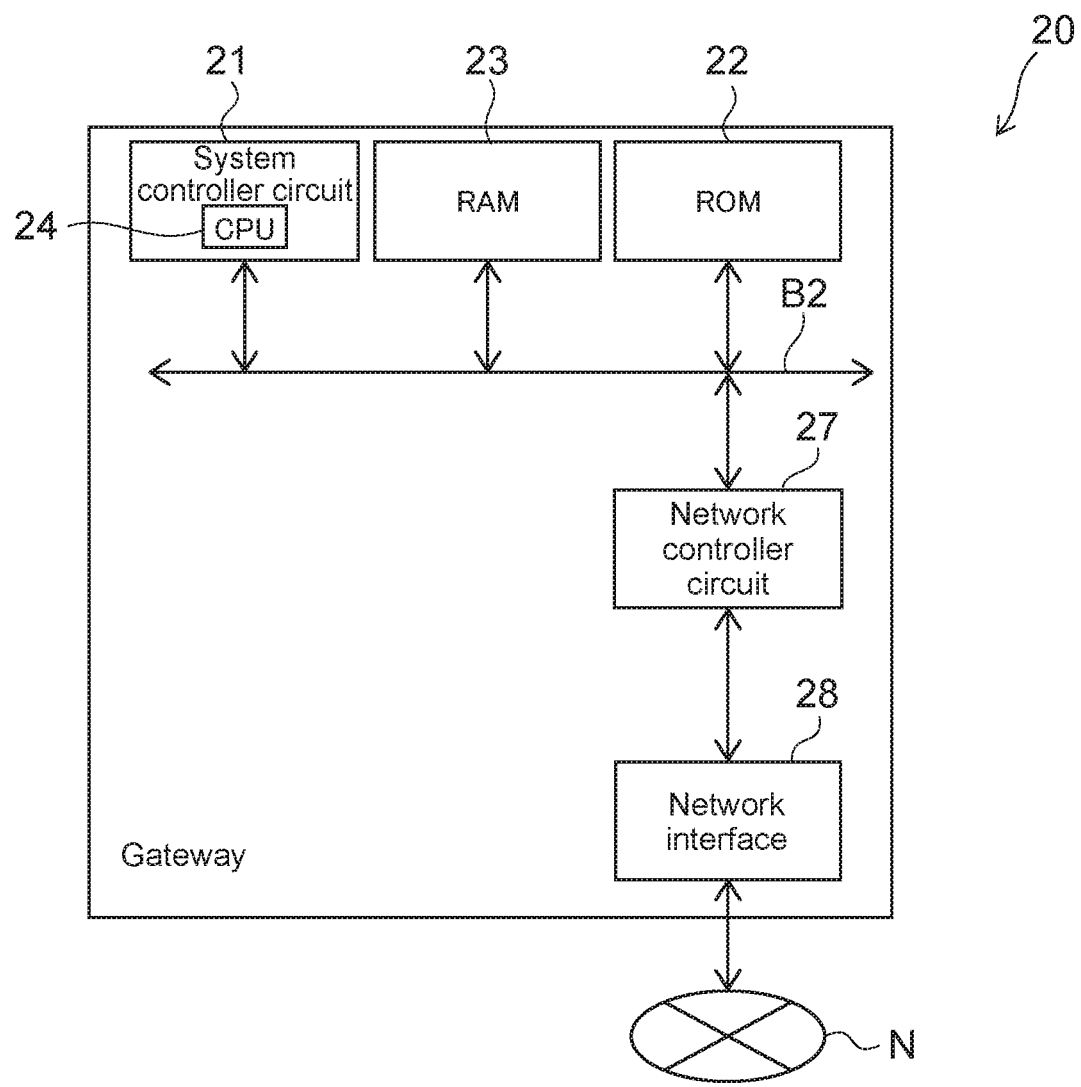
FIG. 3 shows a hardware configuration of a gateway.

FIG. 3 shows a hardware configuration of a gateway.

The gateway 20 includes the system controller circuit 21 (second controller circuit) including the CPU 24, the ROM 22, the RAM 23, and the network controller circuit 27 to which the network interface 28 is connected. The system controller circuit 21, the ROM 22, the RAM 23, and the network controller circuit 17 are connected to each other via the bus B2.

The system controller circuit 21 includes the CPU 24. The CPU 24 of the system controller circuit 21 loads the OS (second OS) and information processing programs stored in the ROM 22 in the RAM 23, and executes the OS (second OS) and the information processing programs.

The ROM 22 is a nonvolatile memory, and stores the OS (second OS), the information processing programs, and the like executable by the system controller circuit 21. The second OS executable by the gateway 20 is different from the first OS executable by the image forming apparatus 10.

The network controller circuit 27 controls the network interface 28.

The network interface 28 is an interface for connecting to the network N. The system controller circuit 21 connects to the network N via the network interface 28. The network interface 28 is an interface of a physical layer (PHY). In a data link layer such as GMAC (Ethernet (registered trademark) MAC), the network interface 28 converts electronic signals to logical signals (bit string) (when receiving), and converts logical signals (bit string) to electronic signals (when sending).

4. Operational Flow of Information Processing System

Figure 4:
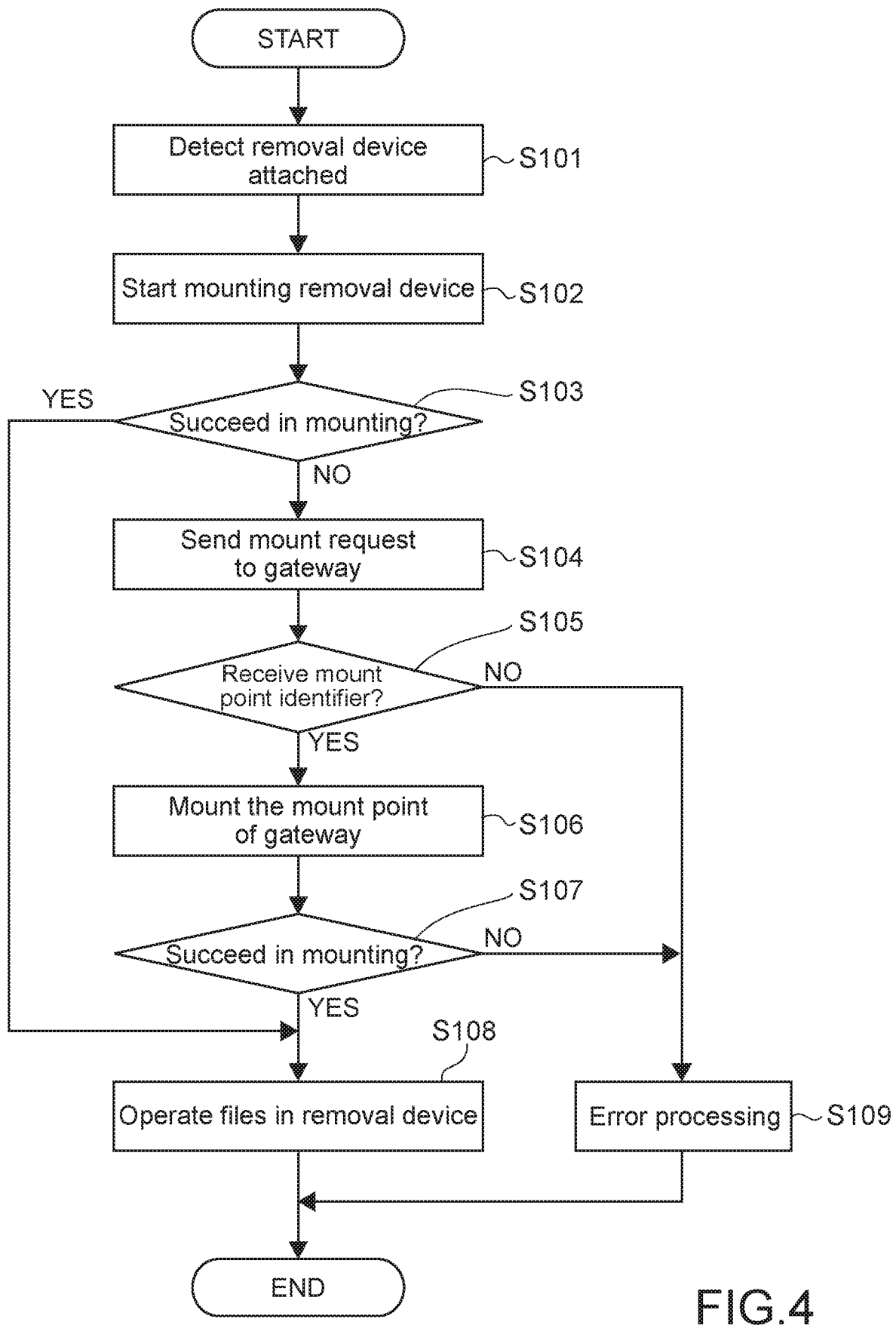
FIG. 4 shows an operational flow of the image forming apparatus.

FIG. 4 shows an operational flow of the image forming apparatus.

The system controller circuit 11 of the image forming apparatus 10 detects the removal device 30 attached to the removal device interface 19 by a user (Step S101).

The system controller circuit 11 of the image forming apparatus 10 starts mounting the removal device 30 by using the file system supported by the OS (first OS) (Step S102).

Where the OS (first OS) of the image forming apparatus 10 supports the file system (for example, VFAT (Virtual File Allocation Table), exFAT (Extended FAT), etc.) of the removal device 30, the system controller circuit 11 succeeds in mounting the removal device 30 (Step S103, YES). Where the system controller circuit 11 of the image forming apparatus 10 succeeds in mounting the removal device 30 (Step S103, YES), the system controller circuit 11 operates files (reads and writes files) in the removal device 30 (Step S108).

Meanwhile, where the OS (first OS) of the image forming apparatus 10 fails to support the file system of the removal device 30, the system controller circuit 11 does not succeed in mounting the removal device 30 (Step S103, NO).

Where the system controller circuit 11 of the image forming apparatus 10 does not succeed in mounting the removal device 30 (Step S103, NO), the system controller circuit 11 sends, to the gateway 20 via the network N, a mount request to mount the removal device 30 (Step S104).

Figure 5:
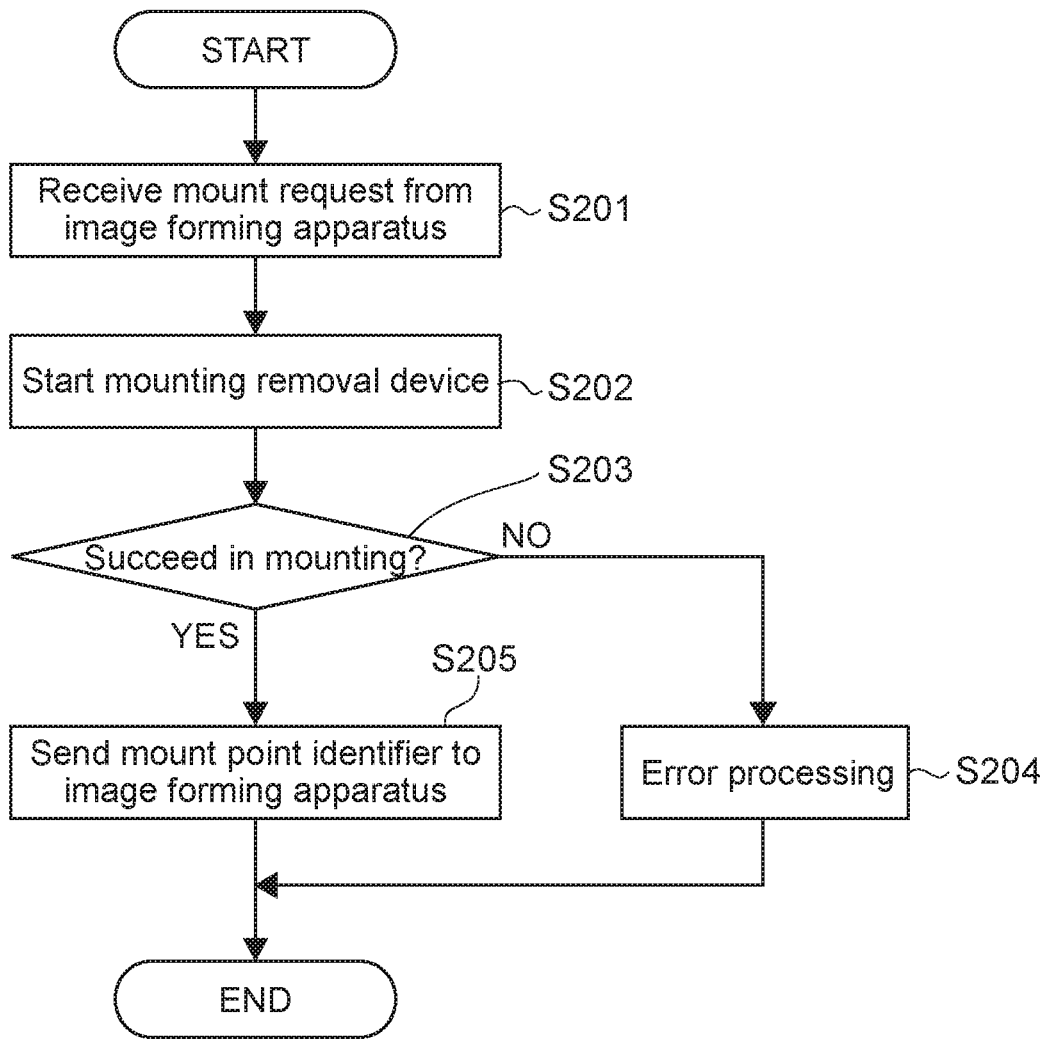
FIG. 5 shows an operational flow of the gateway.

FIG. 5 shows an operational flow of the gateway.

The system controller circuit 21 of the gateway 20 receives the mount request from the image forming apparatus 10 via the network N (Step S201). The system controller circuit 21 starts mounting the removal device 30, which is attached to the removal device interface 19 of the image forming apparatus 10, to the gateway 20 by using the file system supported by the OS (second OS) (Step S202).

Where the OS (second OS) of the gateway 20 fails to support the file system of the removal device 30, the system controller circuit 21 does not succeed in mounting the removal device 30 (Step S203, NO), and executes error processing (Step S204). In this case, also, the system controller circuit 11 of the image forming apparatus 10 cannot receive a mount point identifier from the gateway 20 (Step S105, NO), and executes error processing (Step S109).

Meanwhile, where the OS (second OS) of the gateway 20 supports the file system of the removal device 30, the system controller circuit 21 succeeds in mounting the removal device 30 (Step S203, YES).

Where the system controller circuit 21 succeeds in mounting (Step S203, YES), the system controller circuit 21 sends a mount point identifier to the image forming apparatus 10 via the network N. The mount point identifier is an identifier indicating the mount point of the removal device 30 mounted on the gateway 20 (Step S205). The "mount point identifier" is an identifier identifying the mount point, i.e., the directory (directory of the gateway 20) on which the removal device 30 is mounted.

The system controller circuit 11 of the image forming apparatus 10 receives the mount point identifier from the gateway 20 via the network N (Step S105, YES). The system controller circuit 11 mounts the mount point of the gateway 20 indicated by the mount point identifier via the network N (Step S106). In other words, the system controller circuit 11 accesses, with reference to the mount point identifier, the directory of the gateway 20 via the network N. Where the system controller circuit 11 succeeds in mounting (Step S107, YES), the system controller circuit 11 operates files (reads and writes files) in the removal device 30 (NFS, Network File System) (Step S108). Meanwhile, where the system controller circuit 11 does not succeed in mounting (Step S107, NO), the system controller circuit 11 executes error processing (Step S109).

5. Conclusion

If an OS of an image forming apparatus fails to support a file system of a removal device (for example, removal medium) attachable to the image forming apparatus, the image forming apparatus is not capable of mounting the removal medium and thereby not capable of operating a file of the removal medium.

To the contrary, according to the present embodiment, the system controller circuit 11 of the image forming apparatus 10 is configured to send, to the gateway 20, a mount request to mount the removal device 30. The system controller circuit 21 of the gateway 20 is configured to mount, on the gateway 20, the removal device attached to the removal device 30 interface of the image forming apparatus 10, and send a mount point identifier to the image forming apparatus 10, the mount point identifier being an identifier indicating a mount point of the removal device 30 mounted on the gateway 20.

As a result, according to the present embodiment, even if it is actually not possible for the image forming apparatus 10 to mount the removal device 30 because the OS (first OS) of the image forming apparatus 10 fails to support the file system of the removal device 30 attachable to the image forming apparatus 10, the system controller circuit 11 of the image forming apparatus 10 is capable of mounting the mount point of the gateway 20 indicated by the mount point identifier received from the gateway 20 and capable of operating files in the removal device 30.

According to the present embodiment, the image forming apparatus 10 is connected to the gateway 20 via the network N. The network N fails to include the Internet N1.

According to this configuration, the gateway 20, which is connected to the image forming apparatus 10 via the network N (LAN) failing to include the Internet N1, mounts the removal device 30 connected to the network N (LAN) in place of the image forming apparatus 10. Therefore the security level is higher than an assumption that a removal device is mounted via the Internet.

According to the present embodiment, the plurality of image forming apparatuses 10 are connected to the gateway 20 via the network N.

According to this configuration, even if the OSs (first OSs) of the plurality of image forming apparatuses 10 fail to support the file system of the removal device 30, if only one OS (second OS) of the gateway 20 supports the file system of the removal device 30 attachable to the image forming apparatuses 10, it is possible for the plurality of image forming apparatuses 10 to mount the removal device 30 via NFS. It is not necessary to, for example, update the OSs of the plurality of image forming apparatuses 10. It is only necessary for the OS (second OS) of only one gateway 20 to support the file system of the removal device 30 attachable to the image forming apparatus 10. As a result, operation and management costs are saved.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing system, comprising:
   a first information processing apparatus including
      a removal device interface, and
      a first controller circuit configured to execute a first OS (Operation System), the first OS failing to support a file system of a removal device, the removal device being attachable to the removal device interface; and
a second information processing apparatus connectable to the first information processing apparatus via a network and including a second controller circuit configured to execute a second OS, the second OS supporting the file system,
the first controller circuit of the first information processing apparatus being configured to
  detect the removal device attached to the removal device interface, and
  send, to the second information processing apparatus, a mount request to mount the removal device,
the second controller circuit of the second information processing apparatus being configured to
  receive the mount request from the first information processing apparatus,
  mount, on the second information processing apparatus, the removal device attached to the removal device interface of the first information processing apparatus, and
  send a mount point identifier to the first information processing apparatus, the mount point identifier being an identifier indicating a mount point of the removal device mounted on the second information processing apparatus,
the first controller circuit of the first information processing apparatus being further configured to
  receive the mount point identifier from the second information processing apparatus, and
  mount the mount point of the second information processing apparatus indicated by the mount point identifier.

2. The information processing system according to claim 1, wherein
  the second information processing apparatus is a gateway, and
  the network fails to include Internet.

3. The information processing system according to claim 1, wherein
  the information processing system includes a plurality of the first information processing apparatuses.

4. An information processing method executable by an information processing system, including
  a first information processing apparatus including
    a removal device interface, and
    a first controller circuit configured to execute a first OS (Operation System), the first OS failing to support a file system of a removal device, the removal device being attachable to the removal device interface, and
  a second information processing apparatus connectable to the first information processing apparatus via a network and including a second controller circuit configured to execute a second OS, the second OS supporting the file system,
the information processing method comprising:
by the first controller circuit of the first information processing apparatus,
  detecting the removal device attached to the removal device interface; and
  sending, to the second information processing apparatus, a mount request to mount the removal device;
by the second controller circuit of the second information processing apparatus,
  receiving the mount request from the first information processing apparatus;
  mounting, on the second information processing apparatus, the removal device attached to the removal device interface of the first information processing apparatus; and
  sending a mount point identifier to the first information processing apparatus, the mount point identifier being an identifier indicating a mount point of the removal device mounted on the second information processing apparatus; and
by the first controller circuit of the first information processing apparatus, further,
  receiving the mount point identifier from the second information processing apparatus; and
  mounting the mount point of the second information processing apparatus indicated by the mount point identifier.

* * * * *